United States Patent
Fang et al.

(10) Patent No.: US 12,167,105 B2
(45) Date of Patent: Dec. 10, 2024

(54) RESTORING A VIDEO FOR IMPROVED WATERMARK DETECTION

(71) Applicant: Tencent Technology (Shenzhen) Company Limited, Guangdong (CN)

(72) Inventors: Yang Fang, Shenzhen (CN); Tao Wu, Shenzhen (CN); Xuyuan Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 165 days.

(21) Appl. No.: 17/963,844

(22) Filed: Oct. 11, 2022

(65) Prior Publication Data

US 2023/0043154 A1 Feb. 9, 2023

Related U.S. Application Data

(63) Continuation of application No. PCT/CN2021/118055, filed on Sep. 13, 2021.

(30) Foreign Application Priority Data

Sep. 29, 2020 (CN) .......................... 202011051424.2

(51) Int. Cl.
*H04N 21/8358* (2011.01)
(52) U.S. Cl.
CPC ............................ *H04N 21/8358* (2013.01)
(58) Field of Classification Search
CPC ................................................. H04N 21/8358
See application file for complete search history.

(56) References Cited

U.S. PATENT DOCUMENTS

| 6,360,000 | B1 | 3/2002 | Collier |
| 2003/0021439 | A1* | 1/2003 | Lubin ................... G06T 1/0071 |
| | | | 382/100 |

(Continued)

FOREIGN PATENT DOCUMENTS

| CN | 1971613 A | 5/2007 |
| CN | 101635843 A | 1/2010 |

(Continued)

OTHER PUBLICATIONS

International Search Report and Written Opinion issued in International Application No. PCT/CN2021/118055, mailed Dec. 14, 2021, with English Translation, 9 pages.

(Continued)

*Primary Examiner* — James R Sheleheda
(74) *Attorney, Agent, or Firm* — ArentFox Schiff LLP

(57) ABSTRACT

A watermark detection method includes identifying, among plural stored videos, a second video having a second video feature matching a first video feature of a first video, the second video comprising watermark information. The method further includes comparing the first video and the second video to obtain a video conversion parameter, the video conversion parameter indicating a difference between the first video and the second video. The method also includes converting the first video based on the video conversion parameter to obtain a third video, and performing watermark detection on the third video to obtain watermark information in the third video. Apparatus and non-transitory computer-readable storage medium counterpart embodiments are also contemplated.

20 Claims, 7 Drawing Sheets

(56) References Cited

U.S. PATENT DOCUMENTS

| | | | |
|---|---|---|---|
| 2004/0103293 A1* | 5/2004 | Ryan | H04N 21/8358 |
| | | | 713/193 |
| 2004/0258397 A1* | 12/2004 | Kim | G06V 20/46 |
| | | | 386/257 |
| 2005/0018875 A1* | 1/2005 | Lubin | G06T 1/005 |
| | | | 382/100 |
| 2007/0003059 A1* | 1/2007 | Langelaar | G06T 1/0028 |
| | | | 380/241 |
| 2008/0226125 A1* | 9/2008 | Van Leest | G06T 1/0064 |
| | | | 704/E19.009 |
| 2009/0220070 A1* | 9/2009 | Picard | G06T 1/0028 |
| | | | 380/28 |
| 2009/0238465 A1* | 9/2009 | Lee | G06V 20/40 |
| | | | 382/218 |
| 2010/0247073 A1* | 9/2010 | Nam | G06V 20/47 |
| | | | 386/E5.003 |
| 2013/0148884 A1* | 6/2013 | Lee | G06F 16/785 |
| | | | 382/165 |
| 2014/0270531 A1* | 9/2014 | Nakagata | G06V 20/48 |
| | | | 382/191 |
| 2022/0172476 A1* | 6/2022 | Li | G06V 20/46 |
| 2023/0043154 A1* | 2/2023 | Fang | H04N 21/44008 |

FOREIGN PATENT DOCUMENTS

| | | | | |
|---|---|---|---|---|
| CN | 107995500 A | | 5/2018 | |
| CN | 111191591 A | | 5/2020 | |
| WO | WO-2010011991 A2 * | 1/2010 | | G06F 16/7834 |

OTHER PUBLICATIONS

M.Kutter. "Watermarking Resisting to Translation. Rotation. and Scaling." Proceedings of the SPIE, Dec. 31, 1999.

* cited by examiner

RESTORING A VIDEO FOR IMPROVED WATERMARK DETECTION

RELATED APPLICATIONS

This application is a continuation of International Application No. PCT/CN2021/118055, entitled "WATERMARK DETECTION METHOD AND APPARATUS, COMPUTER DEVICE AND STORAGE MEDIUM" and filed Sep. 13, 2021, which claims priority to Chinese Patent Application No. 202011051424.2, entitled "WATERMARK DETECTION METHOD AND APPARATUS, COMPUTER DEVICE, AND STORAGE MEDIUM" and filed on Sep. 29, 2020. The entire disclosures of the prior applications are hereby incorporated by reference.

FIELD OF THE TECHNOLOGY

Embodiments of this application relate to the field of computer technologies, including a watermark detection method and apparatus, a computer device, and a storage medium.

BACKGROUND OF THE DISCLOSURE

Digital watermarking technology refers to the technology of embedding watermark information in data, which is an effective way to implement anti-counterfeiting traceability as well as copyright protection. For example, before a video is published, watermark information of a publisher is embedded in the video to indicate the identity of the publisher, thereby protecting the video from piracy. Therefore, how to detect a watermark has become an urgent problem to be resolved.

SUMMARY

Embodiments of this disclosure provide a watermark detection method and apparatus, a computer device, and a storage medium, so that the accuracy of watermark detection can be improved. The technical solutions are as follows.

In an embodiment, a watermark detection method includes identifying, among plural stored videos, a second video having a second video feature matching a first video feature of a first video, the second video comprising watermark information. The method further includes comparing the first video and the second video to obtain a video conversion parameter, the video conversion parameter indicating a difference between the first video and the second video. The method also includes converting the first video based on the video conversion parameter to obtain a third video, and performing watermark detection on the third video to obtain watermark information in the third video.

In an embodiment, a watermark detection apparatus includes processing circuitry configured to identify, among plural stored videos, a second video having a second video feature matching a first video feature of a first video, the second video comprising watermark information. The processing circuitry is further configured to compare the first video and the second video to obtain a video conversion parameter, the video conversion parameter indicating a difference between the first video into the second video. The processing circuitry is further configured to convert the first video based on the video conversion parameter to obtain a third video, and perform watermark detection on the third video to obtain watermark information in the third video.

In an embodiment, a non-transitory computer-readable storage medium stores computer-readable instructions thereon, which, when executed by processing circuitry, cause the processing circuitry to perform a watermark detection method. The watermark detection method includes identifying, among plural stored videos, a second video having a second video feature matching a first video feature of a first video, the second video comprising watermark information. The method further includes comparing the first video and the second video to obtain a video conversion parameter, the video conversion parameter indicating a difference between the first video and the second video. The method also includes converting the first video based on the video conversion parameter to obtain a third video, and performing watermark detection on the third video to obtain watermark information in the third video.

The embodiments of this disclosure provide a reference watermark detection method. A first video may be a video obtained after a second video is processed. Therefore, the first video is used as a reference. The first video is restored based on a video conversion parameter, so that watermark information can be synchronously restored, to perform watermark detection on the restored video, thereby improving the accuracy of watermark detection compared with direct watermark detection on the first video.

BRIEF DESCRIPTION OF THE DRAWINGS

To describe the technical solutions in the embodiments of this disclosure, the following briefly describes accompanying drawings describing the embodiments. The accompanying drawings in the following descriptions show merely some embodiments of this application, and a person of ordinary skill in the art may still derive other accompanying drawings from these accompanying drawings.

DESCRIPTION OF EMBODIMENTS

To make the objectives, technical solutions, and advantages of the embodiments of this disclosure clearer, the implementations of this disclosure are further described below in detail with reference to the accompanying drawings.

It may be understood that the terms "first", "second", and the like used in this disclosure may be used for describing various concepts in this specification. However, the concepts are not limited by the terms unless otherwise specified. The terms are merely used for distinguishing one concept from another concept. For example, without departing from the scope of this disclosure, a first video frame may be referred to as a second video frame, and similarly, the second video frame may be referred to as the first video frame.

"At least one" means one or more. For example, at least one template video feature may be any integer (greater than or equal to 1) number of template video features such as one template video feature, two template video features, or three template video features. "Plurality of" means two or more. For example, a plurality of video frames may be any integer (greater than or equal to 2) number of video frames such as two video frames or three video frames. "Each" means each one in "at least one". For example, each video frame means each video frame in a plurality of video frames. If the plurality of video frames are three video frames, each video frame means each video frame in the three video frames.

Embodiments of this disclosure provide a watermark detection method, performed by a computer device such as a terminal or a server. The terminal may be a smartphone, a tablet computer, a notebook computer, a desktop computer, a smart speaker, a smart television, a smartwatch, or the like, but is not limited thereto. The server may be an independent physical server, or may be a server cluster or a distributed system formed by a plurality of physical servers, or may be a cloud server providing basic cloud computing services, such as a cloud service, a cloud database, cloud computing, a cloud function, cloud storage, a network service, cloud communication, a middleware service, a domain name service, a security service, a content delivery network (CDN), and a big data and artificial intelligence platform.

Figure 1:
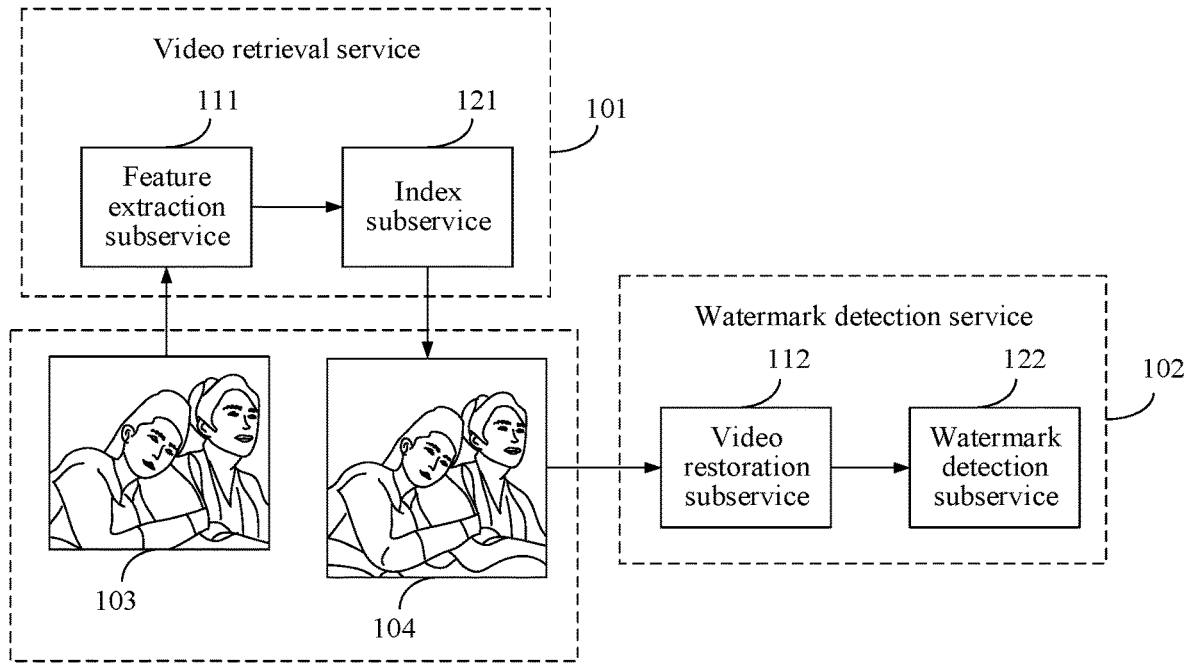
FIG. 1 is an architectural diagram of a watermark detection system according to an embodiment of this disclosure.

FIG. 1 is an architectural diagram of a watermark detection system according to an embodiment of this disclosure. Referring to FIG. 1, a video retrieval service 101 and a watermark detection service 102 are run in the watermark detection system. The video retrieval service 101 is configured to retrieve a second video embedded with watermark information. The watermark detection service 102 is configured to detect a watermark.

The video retrieval service 101 includes a feature extraction subservice 111 and an index subservice 121. The feature extraction subservice 111 is configured to extract a feature of a first video. The index subservice 121 is configured to retrieve a second video according to the extracted feature. The watermark detection service 102 includes a video restoration subservice 112 and a watermark detection subservice 122. The video restoration subservice 112 is configured to restore the first video according to the second video. The watermark detection subservice 122 is configured to perform watermark detection on a restored third video.

For example, the first video is a pirated video 103. The feature extraction subservice 111 performs feature extraction on the pirated video 103. The index subservice 121 performs retrieval according to the extracted feature to obtain a copyrighted video 104. The video restoration subservice 112 performs restoration on the pirated video 103 according to the copyrighted video 104, and then the watermark detection subservice 122 performs watermark detection on a restored video.

The watermark detection method provided in the embodiments of this disclosure is applicable to any scenario of watermark detection, for example, a scenario of copyright protection. Watermark information of a publisher is embedded in a published licensed video A. If subsequently a pirate compresses, encodes, crops, or performs other processing on the licensed video A to obtain a pirated video B, because the pirated video B is a video obtained after the licensed video is processed, the watermark information in the pirated video may be lost. By using the method provided in the embodiments of this disclosure, restoration is performed on the pirated video B according to the licensed video A to obtain a restored video C to restore the watermark information in the video, and then watermark detection is performed on the restored video C to obtain the watermark information, to implement copyright protection.

Figure 2:
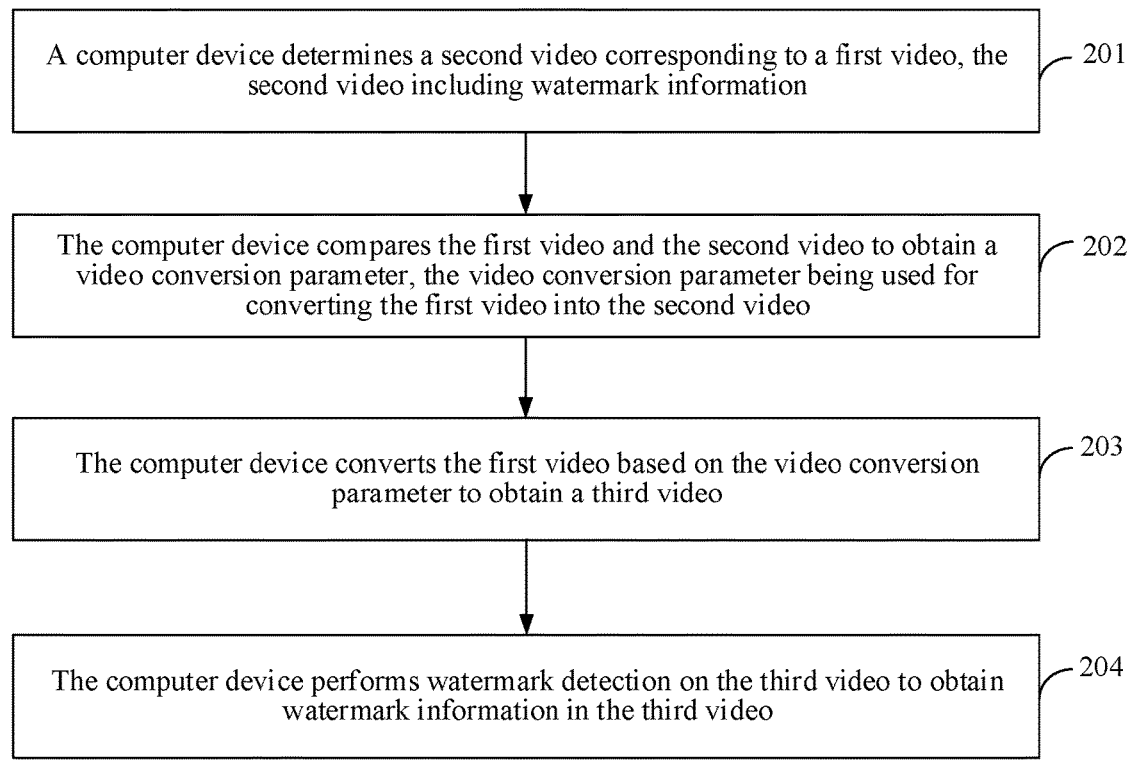
FIG. 2 is a flowchart of a watermark detection method according to an embodiment of this disclosure.

FIG. 2 is a flowchart of a watermark detection method according to an embodiment of this disclosure. The embodiments of this disclosure are performed by a computer device. Referring to FIG. 2, the method includes the following steps.

In step 201, a computer device identifies, among plural stored videos, a second video having a second video feature matching a first video feature of a first video, the second video including watermark information.

The second video is an original video that corresponds to the first video and carries the watermark information. In other words, the second video includes the watermark information. The first video may be obtained after the second video is processed. For example, the first video may be obtained by blurring, zooming, transcoding, compressing, adding noise to, cropping, or performing other processing on the second video.

In the embodiments of this disclosure, the first video is a video that is subject to watermark detection. However, because the first video may be a video obtained after the second video is processed, the watermark information in the first video may be lost or the position of the watermark information has changed, making it difficult to directly detect the watermark information from the first video. Therefore, after obtaining the first video to be detected, the computer device first determines the second video corresponding to the first video.

The computer device may perform watermark detection according to the method provided in the embodiments of this disclosure periodically or may perform watermark detection according to the method provided in the embodiments of this disclosure every time one video is obtained or may perform watermark detection in another scenario.

In step 202, the computer device compares the first video and the second video to obtain a video conversion parameter, the video conversion parameter indicating a difference between the first video and the second video.

Because the first video may be a video obtained after the second video is processed, the first video and the second video may be compared, so that the video conversion parameter is obtained according to a difference between the first video and the second video.

In step 203, the computer device converts the first video based on the video conversion parameter to obtain a third video.

The video conversion parameter is a conversion parameter for converting the first video into the second video. Therefore, the first video is converted based on the video conversion parameter to obtain the third video. This is equivalent to that restoration is performed on the first video obtained after processing to restore a video similar to the second video before processing.

In step 204, the computer device performs watermark detection on the third video to obtain watermark information in the third video.

Because a similarity between the third video and the second video is greater than a similarity between the first video and the second video, a possibility that watermark information in the third video is consistent with watermark information in the second video is greater than a possibility that watermark information in the first video is consistent with the watermark information in the second video. That is, while the video is restored, the watermark information is synchronously restored. Therefore, the accuracy of performing watermark detection on the third video is greater than the accuracy of directly performing watermark detection on the first video.

The third video is a video restored from the first video. Therefore, when watermark detection is performed on the third video, the watermark detection on the first video is indirectly completed.

In the method in the embodiments of this disclosure, a first video may be a video obtained after a second video is processed. Therefore, the first video is used as a reference. The first video is restored based on a video conversion parameter, so that watermark information can be synchronously restored, to perform watermark detection on the restored video, thereby improving the accuracy of watermark detection compared with direct watermark detection on the first video.

Figure 3:
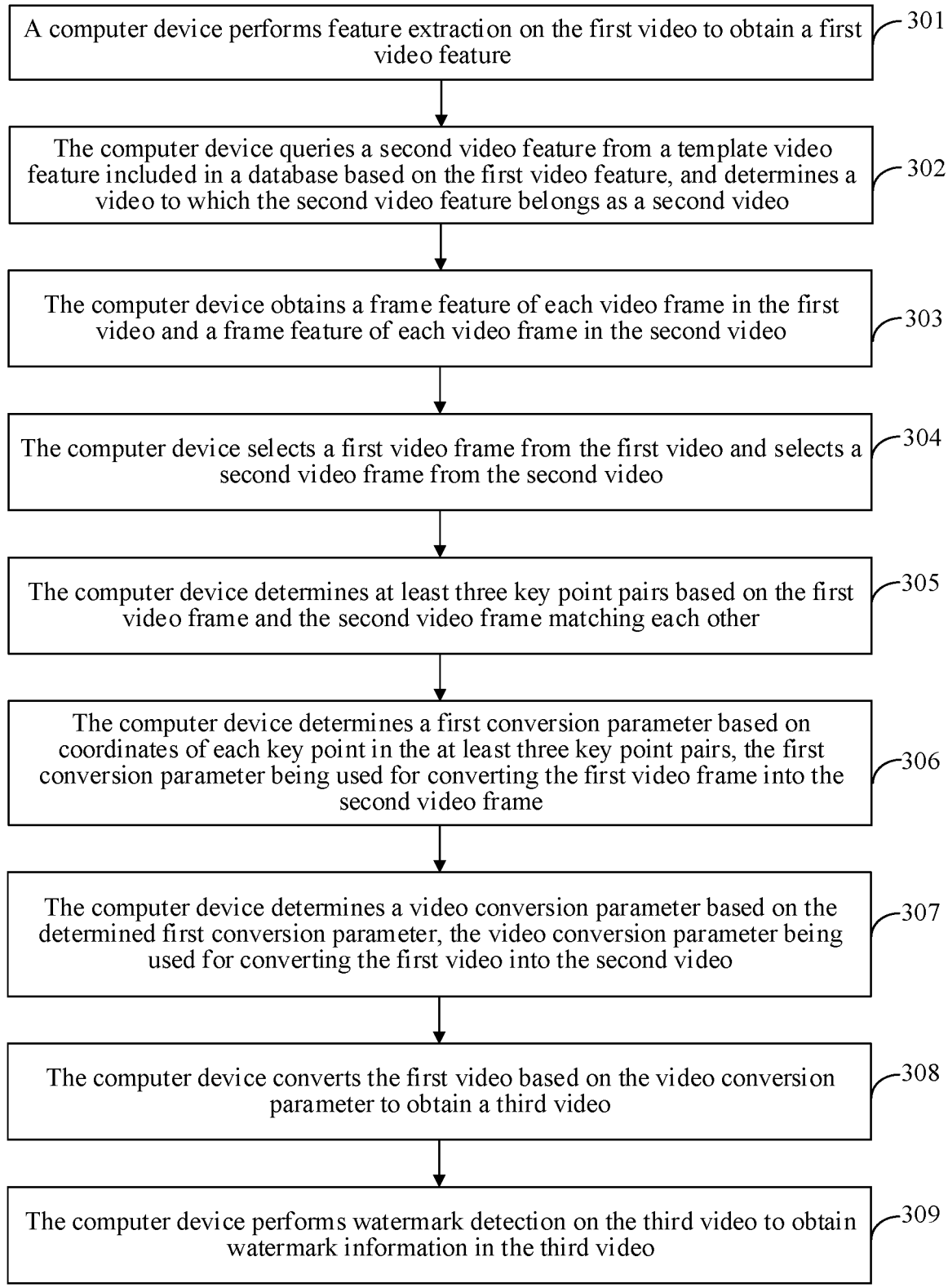
FIG. 3 is a flowchart of another watermark detection method according to an embodiment of this disclosure.

FIG. 3 is a flowchart of a watermark detection method according to an embodiment of this disclosure. The embodiments of this disclosure are performed by a computer device. Referring to FIG. 3, the method includes the following steps.

In step 301, a computer device performs feature extraction on the first video to obtain a first video feature.

A first video and a second video are provided in the embodiments of this disclosure. The first video is a video that is subject to watermark detection. The second video is an original video that corresponds to the first video. That is, the first video may be a video obtained after the second video is processed. For example, the first video is obtained by blurring, zooming, transcoding, compressing, adding noise to, cropping, or performing other processing on the second video.

Figure 4:
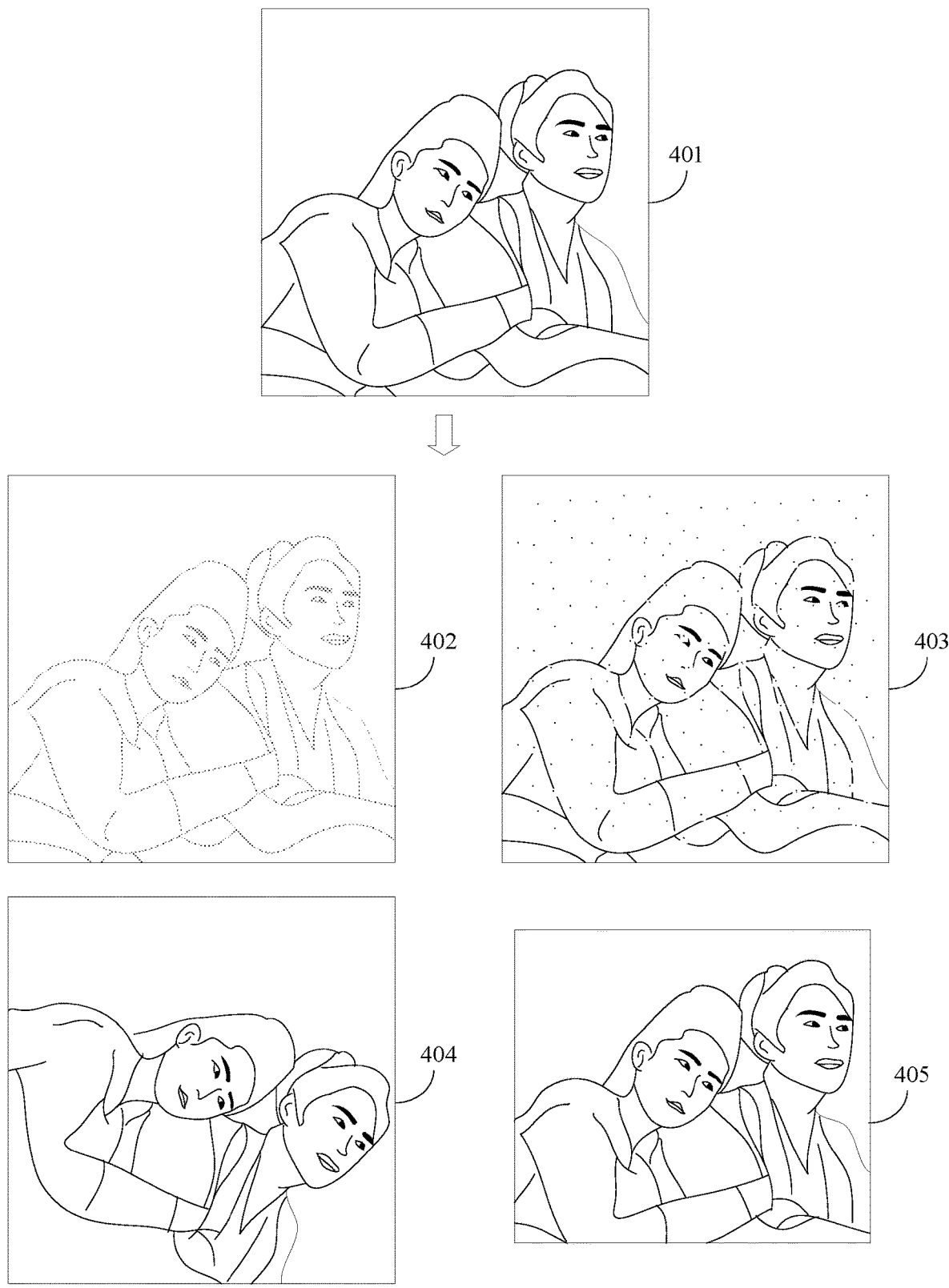
FIG. 4 is a schematic diagram of a video frame according to an embodiment of this disclosure.

For example, as shown in FIG. 4, the first video may be a video 402 obtained by blurring a second video 401. or may be a video 403 obtained by adding noise to the second video 401; or may be a video 404 obtained by rotating the second video 401; or may be a video 405 obtained by cropping the second video 401.

Watermark information is embedded in the second video. For example, frequency domain conversion is performed on a video frame of the second video, watermark information is added to a video frame in a frequency domain, and the watermark information is embedded in different frequency bands. When the watermark information is embedded in a relatively high frequency band, the watermark information is not easily perceivable by human eyes. When the watermark information is embedded in a relatively low frequency band, Because the relatively low frequency band has relatively high energy, the watermark information is not prone to damage. A frequency band in which watermark information is to be embedded may be determined according to an actual requirement in the embodiments of this disclosure.

In some embodiments, a method for embedding watermark information in a video frame of a frequency domain includes discrete cosine transform (DCT), discrete Fourier transform (DFT), discrete wavelet transform (DWT), and other methods.

In some other embodiments, the computer device embeds a digital watermark in the second video by using a digital watermark technology. In the digital watermark technology, a specific digital watermark is embedded in a video, and then the embedded digital watermark is detected by using a corresponding detection mode. The digital watermark includes a visible watermark and an invisible watermark.

Because the first video may be a video obtained after the second video is processed, the watermark information in the first video may be lost or the position of the watermark information has changed, making it difficult to directly detect the watermark information from the first video. Therefore, after obtaining the first video to be detected, the computer device first determines the second video corresponding to the first video by using a video feature of the first video. That is, after obtaining the first video to be detected, the computer device performs feature extraction on the first video to obtain a first video feature. The first video feature is used for representing a feature of the first video.

In a possible implementation, the computer device performs feature extraction on a plurality of video frames in the first video to obtain a frame feature of each video frame in the plurality of video frames; and combines the frame features of the plurality of video frames to obtain the first video feature.

The frame feature is a feature in a frame dimension and is used for representing a feature of a video frame. The video feature is a feature in a video dimension and is used for representing a feature of a video. In some embodiments, the first video feature extracted in the embodiments of this disclosure is used for representing the feature of the first video and is also used for indicating the first video, to differentiate the first video from other videos. For example, the first video feature is a video fingerprint (VF) of the first video.

In some embodiments, the plurality of video frames are obtained by performing frame extraction on the first video by the computer device. For example, the computer device selects key frames from video frames in the first video and uses the selected key frames as the plurality of video frames. In a case that the key frames are indicated by key frame labels, the computer device selects video frames with key frame labels from the video frames in the first video and uses the video frames with key frame labels as the plurality of video frames.

The key frames are some video frames in the first video. For example, the key frames are a subset of video frames in the first video. Therefore, feature extraction is performed on the key frames to determine the first video feature, and it is not necessary to perform feature extraction on all video frames in the first video. In this way, a quantity of video frames on which feature extraction is to be performed is reduced, thereby improving the efficiency of determining the first video feature.

The video frames with key frame labels are the key frames. That is, the key frames can be indicated by key frame labels. However, in some cases, the key frames are not necessarily indicated by key frame labels, and may be indicated in another manner.

The key frames refer to video frames in which key actions of a character or object in a video during movement or change are located. For example, the first video includes an I frame, a P frame, and a B frame. The I frame is an intra-coding frame. The I frame is decompressed by using a video decompression algorithm, so that a complete video picture can be obtained. The P frame is a forward-predicted coding frame. One previous I frame or P frame needs to be used as a reference to decode the P frame to obtain a complete video picture. The B frame is a bidirectionally predicted interpolated coding frame. One previous I frame or P frame needs to be used as a reference to decode the P frame to obtain a complete video picture. The I frame is a key frame.

In some embodiments, the computer device performs feature extraction on the plurality of video frames in the first video by invoking a feature extraction network to obtain a frame feature of each video frame. For example, the feature extraction network is a deep neural network. For example, the feature extraction network is GoogleNet (a neural network), in which inception_4a/output (a deep network layer) and a rectified linear unit (Relu) layer in GoogleNet are removed, and a normalization layer is added. By removing inception_4a/output, the computational amount can be reduced while the performance is ensured, and by removing the Relu layer and adding a normalization layer, the discrimination of extracted features can be ensured. For example, the frame feature extracted by the feature extraction network is a 32-dimensional frame feature.

In step 302, the computer device queries a database based on the first video feature to find a second video feature matching the first video feature, and determines a video including the second video feature as a second video. The second video feature is a template video feature matching the first video feature.

The template video feature matching the first video feature refers to a template video feature with the smallest difference from the first video feature in the template video feature included in the database, that is, a template video feature with the highest similarity to the first video feature.

Because the second video feature and the first video feature have the highest similarity, it indicates that a video to which the second video feature belongs has the highest similarity to the first video. Therefore, the video to which the second video feature belongs is determined as the second video. That is, the video to which the second video feature belongs may be an original video corresponding to the first video.

In a possible implementation, the database of the computer device stores a plurality of template videos and stores a template video feature of each template video. The computer device queries the second video feature from the database, and obtains the video to which the second video feature belongs, that is, the second video, from the database.

In a possible implementation, before querying the second video, the computer device classifies the template video features of the plurality of template videos in the database to obtain a plurality of template feature sets, each template feature set including at least one template video feature, and creates a class label of each template feature set. In this way, the computer device may query a class label to which the first video feature belongs from class labels corresponding to the plurality of template feature sets, and determine the second video feature from the at least one template video feature included in a template feature set corresponding to the class label.

The plurality of template video features are classified to make each class label correspond to at least one template video feature in the template feature set, to implement data binning of the template video features, so that subsequently a class label to which a template video feature belongs can be queried, which is equivalent to that an inverted index is constructed. In some embodiments, the class label may be considered as a codebook created for the template feature set. A template video feature in the template feature set is a code corresponding to the codebook.

In some embodiments, the computer device clusters the template video features by using a k-means algorithm (K-means Clustering Algorithm). That is, the computer device randomly selects K template video features as initial cluster center features from the plurality of template video features, K being an integer greater than 1; obtains a similarity between any other template video feature and each cluster center feature, and adds the template video feature to a template feature set in which a cluster center feature with the highest similarity to the template video feature is located; redetermines a cluster center feature in each template feature set according to at least one current template video feature in each template feature set, repeats the foregoing steps to perform iteration, and stops iteration until a quantity of iterations reaches a set target iteration quantity or a cluster center feature no longer changes, so that the plurality of template feature sets after clustering are obtained. Therefore, compared with a template video feature in another template feature set, a plurality of template video features in the same template feature set have relatively high similarities.

Instead of querying all stored template video features one by one to determine the second video feature, the computer device first determines at least one template video feature in the class label to which the first video feature belongs, to initially complete an approximate search, and then determines the second video feature from the at least one template video feature, so that a search amount is effectively reduced, and the speed of matching video features can be increased.

In the foregoing steps 301 and 302, the second video corresponding to the first video is determined by using a video fingerprint technology. In the video fingerprint technology, a feature of a video is extracted as a fingerprint of the video, so that retrieval and deduplication are performed according to the fingerprint of the video.

By performing the foregoing steps 301 and 302, the computer device determines the second video corresponding to the first video. In the embodiments of this disclosure, an example in which the second video corresponding to the first video is queried according to a video feature is used to describe a process of determining the second video. In addition, the computer device may determine the second video corresponding to the first video in another manner.

Because the first video may be a video obtained after the second video is processed, compared with the second video, a frame rate, a play duration, a frame quantity, and the like of the first video may have changed. As a result, video frames in the first video cannot correspond to video frames in the second video one by one. In this case, frame position alignment may be performed on the first video and the second video to match the video frames in the first video and the video frames in the second video, to facilitate subsequent operations. By performing the following steps 303 and 304, the computer device determines a first video frame in the first video and a second video frame in the second video, the first video frame matching the second video frame, to complete frame position alignment between the first video and the second video.

In step 303, the computer device obtains a frame feature of each video frame in the first video and a frame feature of each video frame in the second video.

After determining the first video and the second video, the computer device performs feature extraction on each video frame in the first video, to obtain a frame feature of each video frame in the first video. The computer device performs feature extraction on each video frame in the second video, to obtain a frame feature of each video frame in the second video.

In a possible implementation, in step 303, frame features obtained by performing feature extraction on video frames in the first video and video frames in the second video by the computer device are local features corresponding to the video frames. For the local features are key point features of a plurality of key points in the video frames, and a plurality of key point features form the local features of the video frames. For example, the key points in the video frames are contour points or the like of a character or an object in the video frames. In some embodiments, the local features are Speeded Up Robust Features (SURF) features. The SURF features have scaling, rotation, and affine transformation invariance. Therefore, the accuracy of obtained video frames can be improved by using the SURF features.

If the frame feature of each video frame in the first video has been extracted from the foregoing step 301, the operation of feature extraction does not need to be performed on the video frames in the first video again in step 303, and the frame feature extracted in step 301 is directly obtained. Alternatively, if the frame feature obtained in the foregoing step 301 is a global feature used for indicating a video frame and the frame feature obtained in step 303 is a local feature used for matching a video frame, the operation of feature extraction on the video frames in the first video is separately performed in steps 301 and 303, and frame features separately extracted are not the same.

In step 304, the computer device selects a first video frame from the first video and selects a second video frame from the second video.

When obtaining the frame feature of each video frame in the first video and the frame feature of each video frame in the second video, the computer device selects, according to a matching status the frame features of the plurality of video frames in the first video and the frame features of the plurality of video frames in the second video, a plurality of first video frames from the first video to form a first video frame sequence and a plurality of second video frames from the second video to form a second video frame sequence, a quantity of the first video frames in the first video frame sequence being the same as a quantity of the second video frames in the second video frame sequence, so that a frame feature of a first video frame in the first video frame sequence matches a frame feature of a second video frame in the second video frame sequence.

In some embodiments, that the frame feature of the first video frame matches the frame feature of the second video frame refers to that the frame feature of the first video frame is the same as the frame feature of the second video frame.

For example, the first video frame sequence includes a first video frame 1, a first video frame 2, and a first video frame 3 arranged in a play sequence, and the second video frame sequence includes a second video frame 4, a second video frame 5, and a second video frame 6 arranged in a play sequence. A frame feature of the first video frame 1 matches a frame feature of the second video frame 4, a frame feature of the first video frame 2 matches a frame feature of the second video frame 5, and a frame feature of the first video frame 3 matches a frame feature of the second video frame 6.

In a possible implementation, the computer device traverses video frames in the first video, every time a video frame is traversed, determines, based on a frame feature of the traversed video frame and frame features of a plurality of first candidate video frames in the second video, a similarity between the traversed video frame and each first candidate video frame, and determines the traversed video frame as the first video frame, and determines a video frame with the highest similarity to the first video frame in the second video as the second video frame, the first video frame matching the second video frame.

That is, the computer device uses each video frame in the first video as a first video frame, and then selects a second video frame matching the first video frame from the video frames in the second video.

For one traversed video frame, the computer device can determine a group of a first video frame and a second video frame matching each other by using the foregoing method. The computer device performs the foregoing operation on each first video frame, so that a plurality of groups of a first video frame and a second video frame matching each other can be determined.

In some embodiments, the frame feature of the video frame includes key point features of a plurality of key points. That is, the frame feature of the traversed video frame includes key point features of a plurality of key points in the video frame, and the frame feature of the first candidate video frame includes key point features of a plurality of key points in the first candidate video frame. A process of determining a similarity between the traversed video frame and each first candidate video frame includes: determining, by the computer device, a similarity between each key point in the traversed video frame and each key point in the first candidate video frame according to a key point feature, determining a proportion of key points with a similarity greater than a third threshold, and uses the determined proportion as the similarity between the traversed video frame and the first candidate video frame.

The computer device may determine a similarity between the traversed video frame and every video frame in the second video, to determine the second video frame, or may determine similarities between the traversed video frame and some video frames in the second video, to determine the second video frame. That is, the foregoing plurality of first candidate video frames may be all video frames in the second video or may be some (a subset of) video frames in the second video.

In a case that the foregoing plurality of first candidate video frames are all the video frames in the second video, the process of determining a similarity between the traversed video frame and each first candidate video frame includes: determining, by the computer device, a similarity between the traversed video frame and each video frame in the second video according to the frame feature of the traversed video frame and the frame feature of each video frame in the second video.

In this manner, the computer device determines the similarity between each video frame in the first video and each video frame in the second video.

In a case that the foregoing plurality of first candidate video frames are some video frames in the second video, the process of determining a similarity between the traversed video frame and each first candidate video frame includes: selecting, by the computer device, one reference video frame from the video frames in the second video at intervals of a second play duration, to obtain a plurality of reference video frames, and determining a similarity between the traversed video frame and each reference video frame according to the frame feature of the traversed video frame and frame features of the plurality of reference video frames.

In this manner, instead of determining the similarity between each video frame in the first video and each video frame in the second video, the computer device first selects a plurality of reference video frames from the video frames in the second video and then determines a similarity between each video frame in the first video and each reference video frame.

The second play duration may be set by the computer device by default, or may be set manually by a detection worker. For example, the second play duration is one second, two seconds, or the like.

In a case that the foregoing plurality of first candidate video frames are all the video frames in the second video, a process of selecting the first video frame and the second video frame includes: after the computer device determines the similarity between the traversed video frame and each video frame in the second video, determining a video frame that has the highest similarity to the traversed video frame and has a similarity greater than a first threshold in the second video as the second video frame, and determining the traversed video frame as the first video frame matching the second video frame.

The computer device may first select a similarity greater than the first threshold from the plurality of determined similarities. If there are a plurality of similarities greater than the first threshold, the traversed video frame is determined as the first video frame, and a video frame corresponding to the highest similarity in the second video is determined as the second video frame. Alternatively, the computer device may first select the highest similarity from the plurality of determined similarities. If the highest similarity is greater than the first threshold, the traversed video frame is used as the first video frame, and a video frame corresponding to the highest similarity in the second video is used as the second video frame.

If none of the plurality of determined similarities is greater than the first threshold, the computer device does not used the traversed video frame as the first video frame, and no longer selects the second video frame matching the first video frame, that is, discards the traversed video frame.

In a case that the foregoing plurality of first candidate video frames are some the video frames in the second video, a process of selecting the second video frame includes: determining, by the computer device, a benchmark video frame from the plurality of first candidate video frames, the benchmark video frame being a first candidate video frame with the highest similarity to the first video frame, determining a plurality of second candidate video frames from the second video, the plurality of second candidate video frames being video frames with a play interval from the benchmark video frame less than a first play duration, determining a similarity between the first video frame and each second candidate video frame based on the frame feature of the first video frame and a frame feature of the each second candidate video frame, and determining the video frame with the highest similarity to the first video frame in the benchmark video frame and the plurality of second candidate video frames as the second video frame matching the first video frame.

The plurality of first candidate video frames in the step are only some (i.e., a subset) of all the video frames in the second video. Therefore, the benchmark video frame determined in the plurality of first candidate video frames is not necessarily the video frame with the highest similarity to the first video frame in all the video frames in the second video. In the second video, a plurality of consecutively played video frames have relatively high similarities. Therefore, in a case that the benchmark video frame has the highest similarity to the first video frame, in a plurality of second candidate video frames with a play interval from the benchmark video frame less than the first play duration, there may be a video frame with a similarity higher than that corresponding to the benchmark video frame. To ensure the accuracy of the obtained second video frame, the computer device determines the video frame with the highest similarity to the first video frame in the benchmark video frame and the plurality of second candidate video frames as the second video frame matching the first video frame.

The first play duration may be set by the computer device by default, or may be set manually by a detection worker. For example, the first play duration is one second, two seconds, or the like. In some embodiments, the first play duration is the same as the foregoing second play duration.

In a possible implementation, the computer device selects one reference video frame from the second video at intervals of a second play duration, to obtain a plurality of reference video frames, and determines a similarity between the first video frame and each reference video frame based on the frame feature of the first video frame and frame features of the plurality of reference video frames. In the plurality of reference video frames, the computer device determines a reference video frame with the highest similarity to the first video frame, uses the reference video frame as the benchmark video frame, determines a plurality of second candidate video frames with a play interval from the benchmark video frame less than the first play duration in the second video, determines a similarity between the first video frame and each second candidate video frame based on the frame feature of the first video frame and frame features of the plurality of second candidate video frames, and determines the video frame with the highest similarity to the first video frame in the benchmark video frame and the plurality of second candidate video frames as the second video frame matching the first video frame.

That is, to improve the efficiency and accuracy of frame position alignment, a double matching manner is used in the embodiments of this disclosure. In the first matching, the computer device first matches the first video frame against the reference video frame by using the second play duration as a step size to obtain a roughly matching benchmark video frame. In the second matching, based on the benchmark video frame, the computer device determines a plurality of second candidate video frames frame by frame, to determine the video frame with the highest similarity to the first video frame in the benchmark video frame and the plurality of second candidate video frames as the second video frame matching the first video frame. Through the two times of matching, it is not necessary to match each video frame in the second video against the first video frame, so that the matching speed can be improved.

Figure 5:
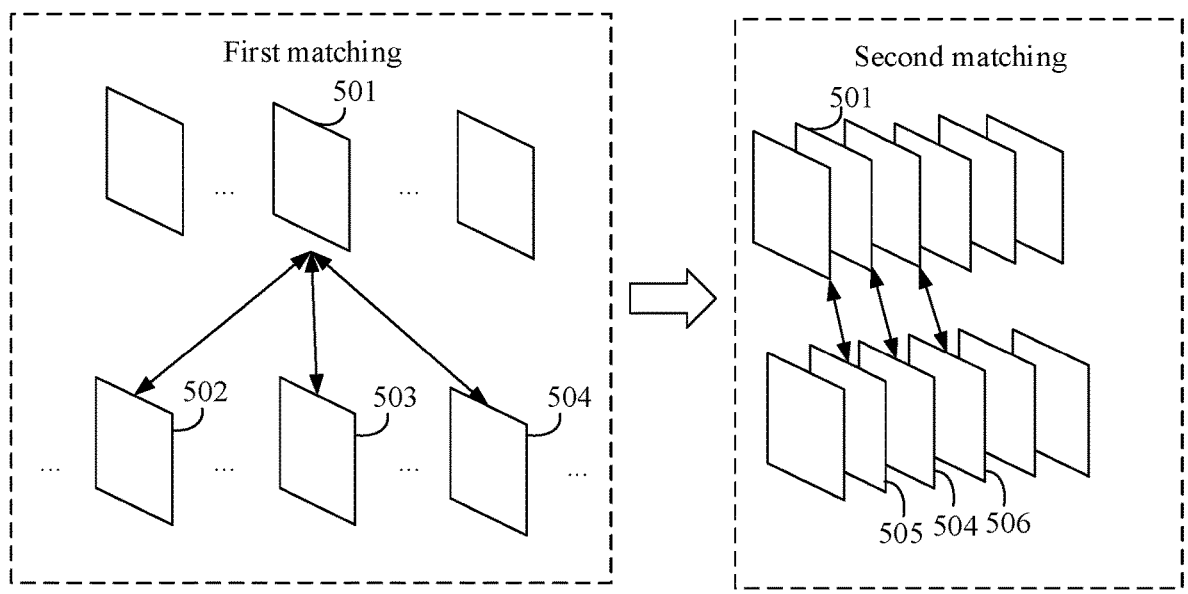
FIG. 5 is a schematic diagram of matching video frames according to an embodiment of this disclosure.

FIG. 5 is a schematic diagram of matching video frames according to an embodiment of this disclosure. Referring to FIG. 5, during the first matching on a first video frame 501, the computer device determines one reference video frame in the second video every one second to obtain a reference video frame 502, a reference video frame 503, and a reference video frame 504. A plurality of video frames are further included between the reference video frame 502, the reference video frame 503, and the reference video frame 504, and are represented by ellipsis in FIG. 5. The computer device respectively determines similarities between the first video frame 501 and the reference video frame 502, the reference video frame 503, and the reference video frame 504, and selects the reference video frame 504 with the highest similarity to complete the first matching. During second matching on the first video frame 501, the computer device determines a reference video frame 505 and a reference video frame 506 with a play duration from the reference video frame 504 less than one second in the second video, respectively determines similarities between the first video frame 501 and the reference video frame 505 and the reference video frame 506, and selects the reference video frame 505 with the highest similarity to the first video frame 501 from the reference video frame 504, the reference video frame 505, and the reference video frame 506 to complete the second matching, so that the first video frame 501 and the reference video frame 505 are used as the first video frame and the second video frame matching each other.

A process of traversing video frames in the first video to determine the first video frame and the second video frame matching each other is described in the embodiments of this disclosure. In some other embodiments, the computer device may further traverse video frames in the second video to determine the first video frame and the second video frame matching each other. This is not limited in the embodiments of this disclosure.

In step 305, the computer device determines at least three key point pairs based on the first video frame and the second video frame matching each other.

In two video frames, a conversion parameter between the two video frames may be uniquely determined by using three groups of non-collinear matching points. Therefore, after determining the first video frame and the second video frame matching each other, the computer device determines at least three key point pairs based on the first video frame and the second video frame, each key point pair including a first key point in the first video frame and a second key point in the second video frame matching the first key point.

In a possible implementation, the computer device obtains first key point features corresponding to a plurality of first key points in the first video frame and second key point features corresponding to a plurality of second key points in the second video frame, respectively determines a similarity between each first key point feature and each second key point feature, and sequentially selects at least three key point pairs in descending order of a similarity between each key point pair.

In some embodiments, when determining a similarity between the first video frame and the second video frame in the foregoing step 304, the computer device has obtained a similarity between each first key point feature and each second key point feature, and can directly obtain the similarity between the first key point feature and the second key point feature without performing the operation of obtaining a similarity between key point features again in step 305.

In step 306, the computer device determines a first conversion parameter based on differences between coordinates of each key point in the at least three key point pairs, the first conversion parameter representing a conversion function from the first video frame to the second video frame.

After determining the at least three key point pairs, the computer device obtains coordinates of each first key point in the first video frame and coordinates of each second key point in the second video frame, and then determines the first conversion parameter based on the coordinates of each key point.

In a possible implementation, because a conversion parameter between the two video frames may be uniquely determined by using the three key point pairs, the computer device determines the first conversion parameter based on the coordinates of each key point in the three key point pairs.

In some embodiments, the first conversion parameter is a conversion matrix, and the computer device obtains the conversion matrix according to the following formula:

$$\begin{bmatrix} x_s \\ y_s \\ 1 \end{bmatrix} = \begin{bmatrix} a_1 & b_1 & c_1 \\ a_2 & b_2 & c_2 \\ 0 & 0 & 1 \end{bmatrix} \begin{bmatrix} x \\ y \\ 1 \end{bmatrix}$$

where $x_s$ and $y_s$ are the horizontal coordinate and the vertical coordinate of a second key point in the second video frame, and x and y are the horizontal coordinate and the vertical coordinate of a first key point matching the second key point. $a_1$ and $b_2$ are scaling coefficients in the conversion matrix, $a_2$ and $b_1$ are rotation coefficients in the conversion matrix, and $c_1$ and $c_2$ are translation coefficients in the conversion matrix. One conversion matrix may be uniquely determined by using the three key point pairs.

In a possible implementation, the computer device obtains more than three key point pairs. The computer device determines a plurality of second conversion parameters based on the coordinates of each key point in the at least three key point pairs, the plurality of second conversion parameters being used for converting the first video frame into the second video frame, similarities between the plurality of second conversion parameters and an average conversion parameter corresponding to the plurality of second conversion parameters being all greater than a second threshold; and determining the average conversion parameter of the plurality of second conversion parameters as the first conversion parameter.

In some embodiments, the computer device determines a plurality of candidate conversion parameters based on coordinates of each key point in the at least three key point pairs, the plurality of candidate conversion parameters being used for converting the first video frame into the second video frame. The computer device determines an average conversion parameter based on the plurality of candidate conversion parameters, selects a plurality of candidate conversion parameters with a similarity to the average conversion parameter greater than a second threshold from the plurality of candidate conversion parameters, and continues to determine average conversion parameters corresponding to the plurality of selected candidate conversion parameters, until similarities between the plurality of selected candidate conversion parameters and corresponding average conversion parameters are all greater than the second threshold. In this case, the computer device determines the plurality of currently selected candidate conversion parameters as the plurality of second conversion parameters, and determines average conversion parameters corresponding to the plurality of second conversion parameters as the first conversion parameter.

First, if a quantity of key point pairs is greater than 3, the computer device randomly selects three key point pairs from the plurality of key point pairs each time and determines one candidate conversion parameter according to the randomly selected three key point pairs, and then continues to randomly select three key point pairs and determines one candidate conversion parameter, so that the computer device may determine a plurality of candidate conversion parameters by repeatedly performing the operation of determining a candidate conversion parameter. A quantity of times of repetition may be set by the computer device. For example, there are 10 key point pairs. The computer device may set the quantity of times of repetition to 6, 7, or the like.

Next, the computer device performs average processing on the plurality of candidate conversion parameters to obtain an average conversion parameter, determines a similarity between each candidate conversion parameter and the average conversion parameter, selects a plurality of candidate conversion parameters with a similarity to the average conversion parameter greater than a second threshold from the plurality of candidate conversion parameters, continues to determine average conversion parameters corresponding to the plurality of selected candidate conversion parameters, and repeatedly performs the operation of obtaining an average conversion parameter, until similarities between the plurality of currently selected candidate conversion parameters and corresponding average conversion parameters are all greater than the second threshold. In this case, the computer device determines the plurality of currently selected candidate conversion parameters as the plurality of second conversion parameters, and determines average conversion parameters corresponding to the plurality of second conversion parameters as the first conversion parameter.

The plurality of key point pairs are iterated to obtain the first conversion parameter, so that a case that the first conversion parameter has a relatively large error due to an error in a key point pair can be effectively avoided, thereby improving the accuracy of the obtained first conversion parameter. In some embodiments, the computer device iterates the plurality of key point pairs by using a random sample consensus (RANCSC) algorithm to obtain a conversion parameter.

In the foregoing steps 305 and 306, a process of obtaining a first conversion parameter between a group of a first video frame and a second video frame matching each other is described. In the embodiments of this disclosure, the computer device performs the operations in steps 305 and 306 on a plurality of determined groups of a first video frame and a second video frame matching each other to obtain a plurality of first conversion parameters.

In step 307, the computer device determines a video conversion parameter based on the determined first conversion parameter, the video conversion parameter representing a conversion function from the first video to the second video.

After determining the plurality of first conversion parameters, the computer device determines the video conversion parameter according to the plurality of first conversion parameters. In some embodiments, the video conversion parameter is an affine transformation parameter for converting the first video into the second video.

In some embodiments, the computer device performs average processing on the plurality of first conversion parameters to obtain the video conversion parameter. In some other embodiments, the computer device performs outlier removal on the plurality of first conversion parameters before performing average processing to obtain the video conversion parameter. The performing outlier removal on the plurality of first conversion parameters refers to removing a first conversion parameter with the largest difference from another first conversion parameter in the plurality of first conversion parameters.

The foregoing steps 305 to 307 are performed to compare the first video frame and the second video frame to obtain the video conversion parameter. In addition, the video conversion parameter may be obtained in another manner.

In step 308, the computer device converts the first video based on the video conversion parameter to obtain a third video.

The video conversion parameter is a conversion parameter for converting the first video into the second video. Therefore, the first video is converted based on the video conversion parameter to obtain the third video. This is equivalent to that restoration is performed on the first video obtained after processing to restore a video similar to the second video before processing.

In a possible implementation, a process of obtaining the third video by the computer device includes: converting each video frame in the first video based on the video conversion parameter to obtain a corresponding video frame in the third video.

In some embodiments, the computer device converts coordinates of each pixel in each video frame in the first video based on the video conversion parameter to obtain coordinates of the pixel in a corresponding video frame in the third video, so that each pixel in each video frame in the first video is mapped to a corresponding video frame in the third video to obtain the third video.

In some embodiments, the computer device determines, based on video frames matching each other in the first video and the second video, a cropped video frame area in the video frame in the second video; and fills the cropped video frame area based on the video frame in the first video, and converts the filled video frame based on the video conversion parameter to obtain the corresponding video frame in the third video.

The first video may be a video obtained after the second video is processed, correspondingly, the video frame in the first video may be a video frame obtained after a corresponding video frame in the second video is processed, and in a case that the video frame in the first video is a video frame obtained after a video frame in the second video is cropped, the size of the video frame has changed. In this case, an error is relatively large if the video frame in the first video is restored only based on the video conversion parameter. Therefore, the computer device determines, based on a video frame in the first video and a video frame in the second video, a cropped video frame area in the video frame in the second video, fills the cropped video frame area based on the video frame in the first video, and then restores the filled video frame. In some embodiments, the computer device performs zero filling on the cropped video frame area, that is, sets pixel values in the cropped video frame area to 0, or performs filling in another manner. This is not limited in the embodiments of this disclosure.

Figure 6:
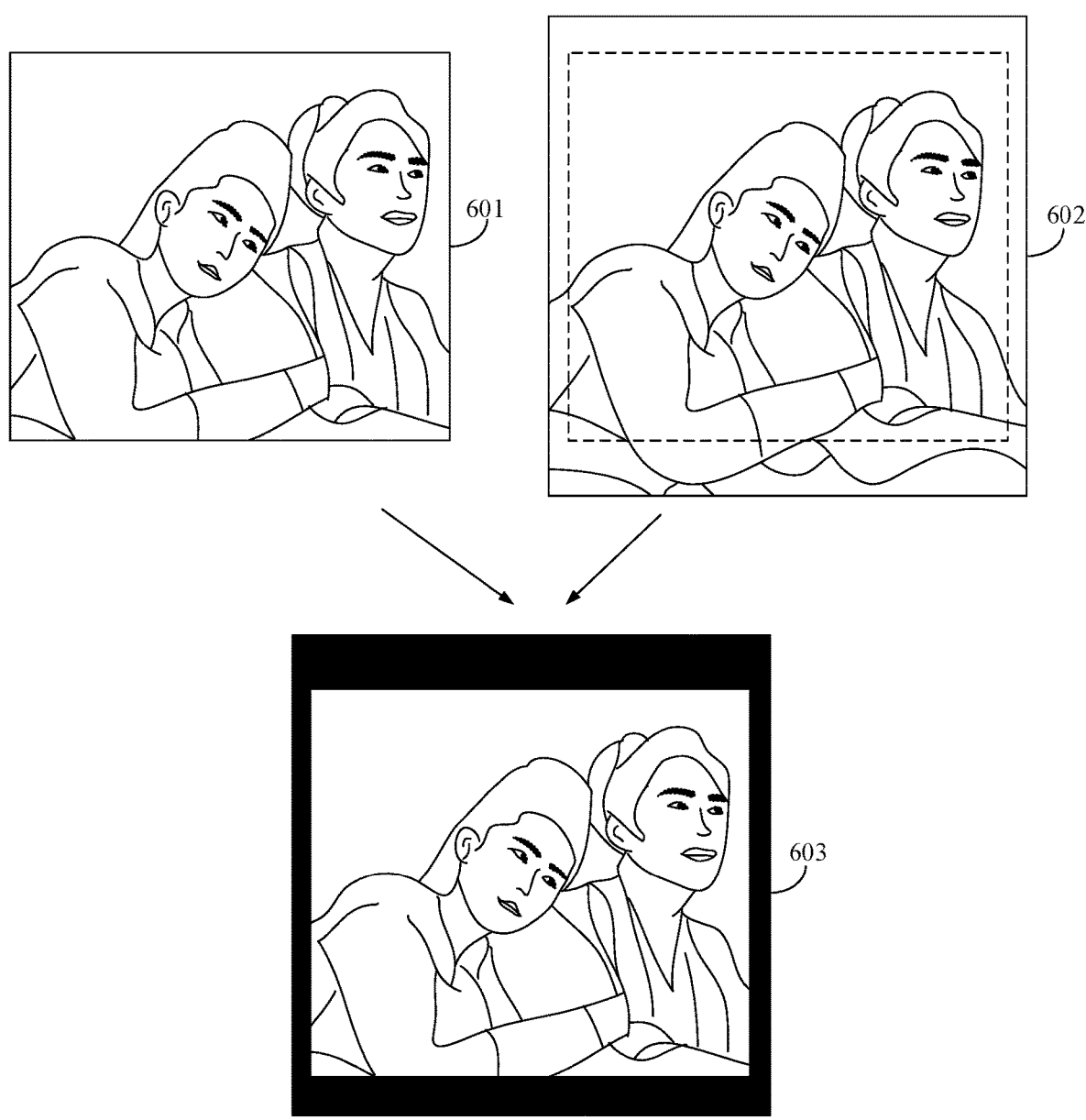
FIG. 6 is a schematic diagram of restoring a video frame according to an embodiment of this disclosure.

FIG. 6 is a schematic diagram of restoring a video frame according to an embodiment of this disclosure. Referring to FIG. 6, a video frame 601 in the first video and a video frame 602 in the second video match. The computer device determines a cropped video frame area in the video frame 602 based on the video frame 601 and the video frame 602, and fills 0 in pixel values in the cropped video frame area based on the video frame 601 to obtain a filled video frame 603.

In step 309, the computer device performs watermark detection on the third video to obtain watermark information in the third video.

Because a similarity between the third video and the second video is greater than a similarity between the first video and the second video, a possibility that watermark information in the third video is consistent with watermark information in the second video is greater than a possibility that watermark information in the first video is consistent with the watermark information in the second video. Therefore, the accuracy of performing watermark detection on the third video is greater than the accuracy of directly performing watermark detection on the first video. The computer device performs watermark detection on the third video to obtain watermark information in the third video, so that watermark detection of the first video is indirectly completed.

In the embodiments of this disclosure, watermark information is embedded in the second video in a frequency domain, so that the watermark information can effectively withstand encoding, blurring, scaling, transcoding, frame rate changing, and other processing. For geometric processing such as cropping or rotation that damages watermark information, because a reference digital watermark (RDW) technology is used, the second video is used as reference to restore the first video to be detected, and while the second video is used to perform restoration on the first video, watermark information can be synchronously restored, so that the watermark information is detected in a manner of detection in a specific frequency domain, thereby providing excellent robustness.

To verify the feasibility of the watermark detection method provided in the embodiments of this disclosure, a video is subject to processing of different types to obtain a plurality of processed videos. Watermark detection is performed on the plurality of processed videos by using the method provided in the embodiments of this disclosure, and detection results are shown in Table 1 below. As can be seen from Table 1, for a geometric processing mode such as cropping that damages watermark information, after the video is restored, a detection rate of 49% is still obtained. Therefore, watermark information in the video can be accurately detected.

quency band from the parameter vector, and performs inverse code division multiple access (CDMA) processing on the obtained frequency domain parameter by using the orthogonal code base, to convert the frequency domain parameter into binary encoding information. The binary encoding information is extracted watermark information.

The embodiments of this disclosure provide a reference watermark detection method. A first video may be a video obtained after a second video is processed. Therefore, the first video is used as a reference. The first video is restored based on a video conversion parameter, so that watermark information can be synchronously restored, to perform watermark detection on the restored video, thereby improving the accuracy of watermark detection compared with direct watermark detection on the first video.

In addition, the template feature set corresponding to the class label to which the first video feature belongs is first determined to initially complete an approximate search, then the second video feature matching the first video feature is determined from the template feature set, and it is not necessary to query all video features one by one, so that a search amount is effectively reduced, and the speed of matching video features can be increased.

In addition, the first video frame and the second video frame matching each other are determined in a double matching manner, and it is not necessary to match each

TABLE 1

| | Processing type | | | | | |
| --- | --- | --- | --- | --- | --- | --- |
| | No processing | Blurring | Frame rate changing | Re-transcoding | Scaling | Sharpening | Cropping |
| Detection rate | 100% | 92% | 100% | 91% | 89% | 94% | 49% |

In a possible implementation, the third video includes a plurality of video frames. The computer device performs watermark detection on any video frame in the plurality of videos to obtain watermark information in the video frame.

In some embodiments, the computer device obtains a plurality of first frequency domain parameters of the any video frame, each first frequency domain parameter corresponding to one frequency band, determines a second frequency domain parameter in the plurality of first frequency domain parameters, the second frequency domain parameter being a frequency domain parameter corresponding to a frequency band in which the watermark information is located, and converts the second frequency domain parameter to obtain the watermark information.

For example, the watermark information is embedded in the second video by using a discrete wavelet transform method. The computer device converts any video frame in the third video into a YUV (a color encoding method) format, where Y represents luminance, U represents chrominance, and V represents concentration. The computer device obtains a Y component, converts the Y component into frequency domain data, obtains a plurality of frequency domain parameters in the frequency domain data, and converts the plurality of frequency domain parameters into a one-dimensional parameter vector, the frequency domain data being data in a discrete wavelet transform domain. The computer device determines a frequency band embedded with watermark information in the second video and an orthogonal code base corresponding to the watermark information, obtains a frequency domain parameter in the frevideo frame in the second video against each video frame in the first video, so that while the efficiency of frame position alignment is improved, the accuracy of frame position alignment is further ensured.

In addition, the plurality of key point pairs are iterated to obtain the first conversion parameter, so that a case that the first conversion parameter has a relatively large error due to an error in a key point pair can be effectively avoided, thereby improving the accuracy of the first conversion parameter.

In addition, after outlier removal is performed on the plurality of first conversion parameters, averaging processing is performed to obtain the video conversion parameter, so that a case in which the video conversion parameter has a relatively large error due to an error in the first conversion parameter can be effectively avoided, thereby improving the accuracy of the video conversion parameter.

Figure 7:
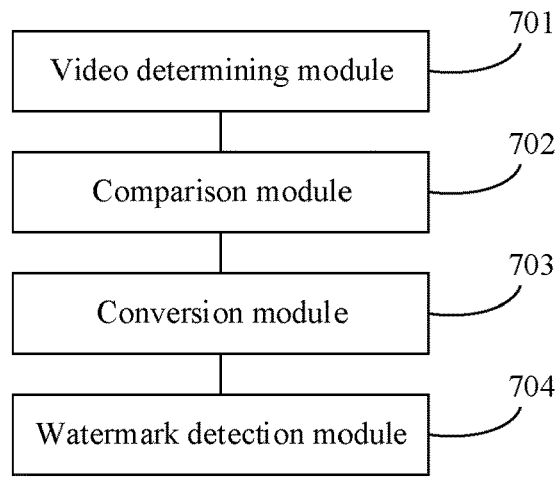
FIG. 7 is a schematic structural diagram of a watermark detection apparatus according to an embodiment of this disclosure.

FIG. 7 is a schematic structural diagram of a watermark detection apparatus according to an embodiment of this disclosure. Referring to FIG. 7, the apparatus includes: a video determining module 701, configured to determine a second video corresponding to a first video, the second video including watermark information; a comparison module 702, configured to compare the first video and the second video to obtain a video conversion parameter, the video conversion parameter being used for converting the first video into the second video; a conversion module 703, configured to convert the first video based on the video conversion parameter to obtain a third video; and ma watermark detection module 704, configured to perform watermark detection on the third video to obtain watermark information in the third video.

Figure 8:
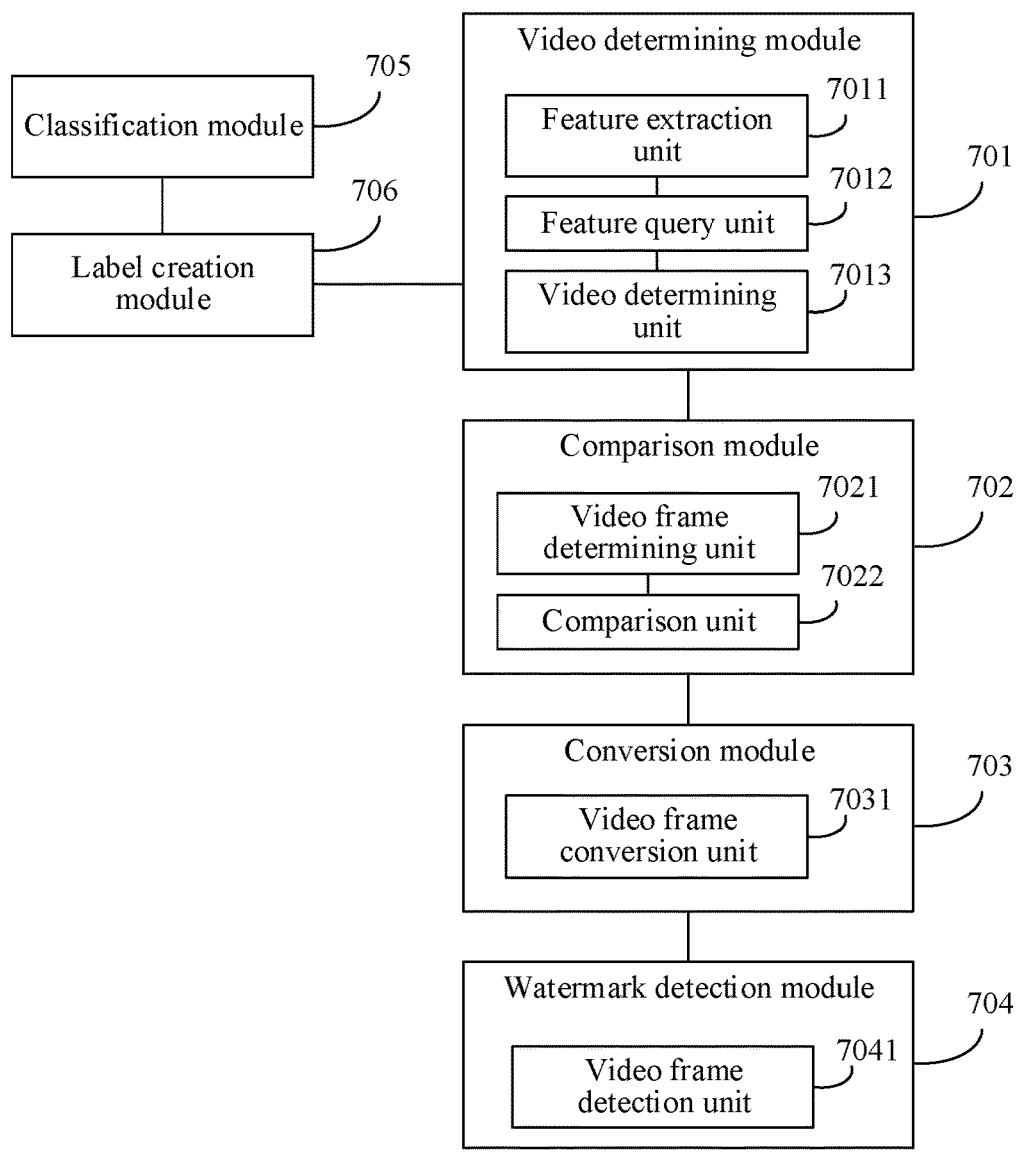
FIG. 8 is a schematic structural diagram of another watermark detection apparatus according to an embodiment of this disclosure.

In some embodiments, referring to FIG. 8, the video determining module 701 includes: a feature extraction unit 7011, configured to perform feature extraction on the first video to obtain a first video feature; a feature query unit 7012, configured to query a second video feature from a template video feature included in a database based on the first video feature, the second video feature being a template video feature matching the first video feature; and a video determining unit 7013, configured to determine a video to which the second video feature belongs as the second video.

In some embodiments, referring to FIG. 8, the feature extraction unit 7011 is configured to: perform feature extraction on the plurality of video frames in the first video to obtain a frame feature of each video frame; combine the frame features of the plurality of obtained video frames to obtain the first video feature.

In some embodiments, referring to FIG. 8, the feature extraction unit 7011 is configured to: select video frames with key frame labels from the plurality of video frames; and perform feature extraction on the video frames with key frame labels to obtain a frame feature of each video frame.

In some embodiments, the database stores a plurality of template feature sets, each template feature set has a corresponding class label, and the each template feature set includes at least one template video feature; and referring to FIG. 8, the feature query unit 7012 is configured to: query a class label to which the first video feature belongs from class labels corresponding to the plurality of template feature sets; and determine the second video feature from a template feature set corresponding to the class label to which the first video feature belongs.

In some embodiments, referring to FIG. 8, the apparatus further includes: a classification module 705, configured to classify the template video features of the plurality of template videos to obtain a plurality of template feature sets; a label creation module 706, configured to create a class label of each template feature set.

In some embodiments, referring to FIG. 8, the comparison module 702 includes: a video frame determining unit 7021, configured to determine a first video frame in the first video and a second video frame in the second video, the first video frame matching the second video frame; and a comparison unit 7022, configured to compare the first video frame and the second video frame matching each other to obtain the video conversion parameter.

In some embodiments, referring to FIG. 8, the video frame determining unit 7021 is configured to: obtain a frame feature of each video frame in the first video and a frame feature of each video frame in the second video; and select the first video frame from the first video and the second video frame from the second video, a frame feature of the first video frame matching a frame feature of the second video frame.

In some embodiments, referring to FIG. 8, the video frame determining unit 7021 is configured to: traverse video frames in the first video; every time a video frame is traversed, determine, based on a frame feature of the traversed video frame and frame features of a plurality of first candidate video frames in the second video, a similarity between the traversed video frame and each first candidate video frame; and determine the traversed video frame as the first video frame, and determine a video frame with the highest similarity to the first video frame in the second video as the second video frame.

In some embodiments, referring to FIG. 8, the video frame determining unit 7021 is configured to: determine a video frame with the highest similarity to the first video frame in the second video and a similarity greater than a first threshold as the second video frame.

In some embodiments, the plurality of first candidate video frames are some video frames in the second video; and referring to FIG. 8, the video frame determining unit 7021 is configured to: determine a benchmark video frame from the plurality of first candidate video frames, the benchmark video frame being a first candidate video frame with the highest similarity to the first video frame; determine a plurality of second candidate video frames from the second video, the plurality of second candidate video frames being video frames with a play interval from the benchmark video frame less than a first play duration; determine a similarity between the first video frame and each second candidate video frame based on the frame feature of the first video frame and a frame feature of the each second candidate video frame; and determine the video frame with the highest similarity to the first video frame in the benchmark video frame and the plurality of second candidate video frames as the second video frame.

In some embodiments, referring to FIG. 8, the video frame determining unit 7021 is configured to: select one reference video frame from the second video frames at intervals of a second play duration, to obtain a plurality of reference video frames; and determine a similarity between the first video frame and each reference video frame based on the frame feature of the first video frame and frame features of the plurality of reference video frames.

In some embodiments, referring to FIG. 8, the comparison unit 7022 is configured to: determine at least three key point pairs based on the first video frame and the second video frame matching each other, each key point pair including a first key point in the first video frame and a second key point in the second video frame matching the first key point; determine a first conversion parameter based on coordinates of each key point in the at least three key point pairs, the first conversion parameter being used for converting the first video frame into the second video frame; and determine the video conversion parameter based on the determined first conversion parameter.

In some embodiments, referring to FIG. 8, the comparison unit 7022 is configured to: obtain first key point features corresponding to a plurality of first key points in the first video frame and second key point features corresponding to a plurality of second key points in the second video frame; respectively determine a similarity between each first key point feature and each second key point feature; and sequentially select at least three key point pairs in descending order of a similarity.

In some embodiments, referring to FIG. 8, the comparison unit 7022 is configured to: determine a plurality of second conversion parameters based on the coordinates of each key point in the at least three key point pairs, the plurality of second conversion parameters being used for converting the first video frame into the second video frame, similarities between the plurality of second conversion parameters and an average conversion parameter corresponding to the plurality of second conversion parameters being all greater than a second threshold; and determining the average conversion parameter corresponding to the plurality of second conversion parameters as the first conversion parameter.

In some embodiments, referring to FIG. 8, the conversion module 703 includes: a video frame conversion unit 7031, configured to convert each video frame in the first video based on the video conversion parameter to obtain a corresponding video frame in the third video; and the watermark detection module 704 includes: a video frame detection unit 7041, configured to perform watermark detection on any video frame in the third video to obtain the watermark information.

In some embodiments, referring to FIG. 8, the video frame conversion unit 7031 is configured to: determine, based on video frames matching each other in the first video and the second video, a cropped video frame area in the video frame in the second video; fills the cropped video frame area based on the video frame in the first video; and convert the filled video frame based on the video conversion parameter to obtain the corresponding video frame in the third video.

In some embodiments, referring to FIG. 8, the video frame detection unit 7041 is configured to: obtain a plurality of first frequency domain parameters of the any video frame, each first frequency domain parameter corresponding to one frequency band; determine a second frequency domain parameter in the plurality of first frequency domain parameters, the second frequency domain parameter being a frequency domain parameter corresponding to a frequency band in which the watermark information is located; and convert the second frequency domain parameter to obtain the watermark information.

When the watermark detection apparatus provided in the foregoing embodiment detects a watermark, the division of the foregoing functional modules is merely used as an example for description. In practice, the foregoing functions may be assigned to and completed by different functional modules as required. That is, an internal structure of the computer device may be divided into different functional modules to complete all or some of the functions described above. In addition, the watermark detection apparatus provided in the foregoing embodiment belongs to the same conception as the embodiment of the watermark detection method. For a specific implementation process thereof, reference may be made to the method embodiment. Details are not described herein again.

The embodiments of this disclosure provide a watermark detection apparatus. A first video may be a video obtained after a second video is processed. Therefore, the first video is used as a reference. The first video is restored based on a video conversion parameter, so that watermark information can be synchronously restored, to perform watermark detection on the restored video, thereby improving the accuracy of watermark detection compared with direct watermark detection on the first video.

Figure 9:
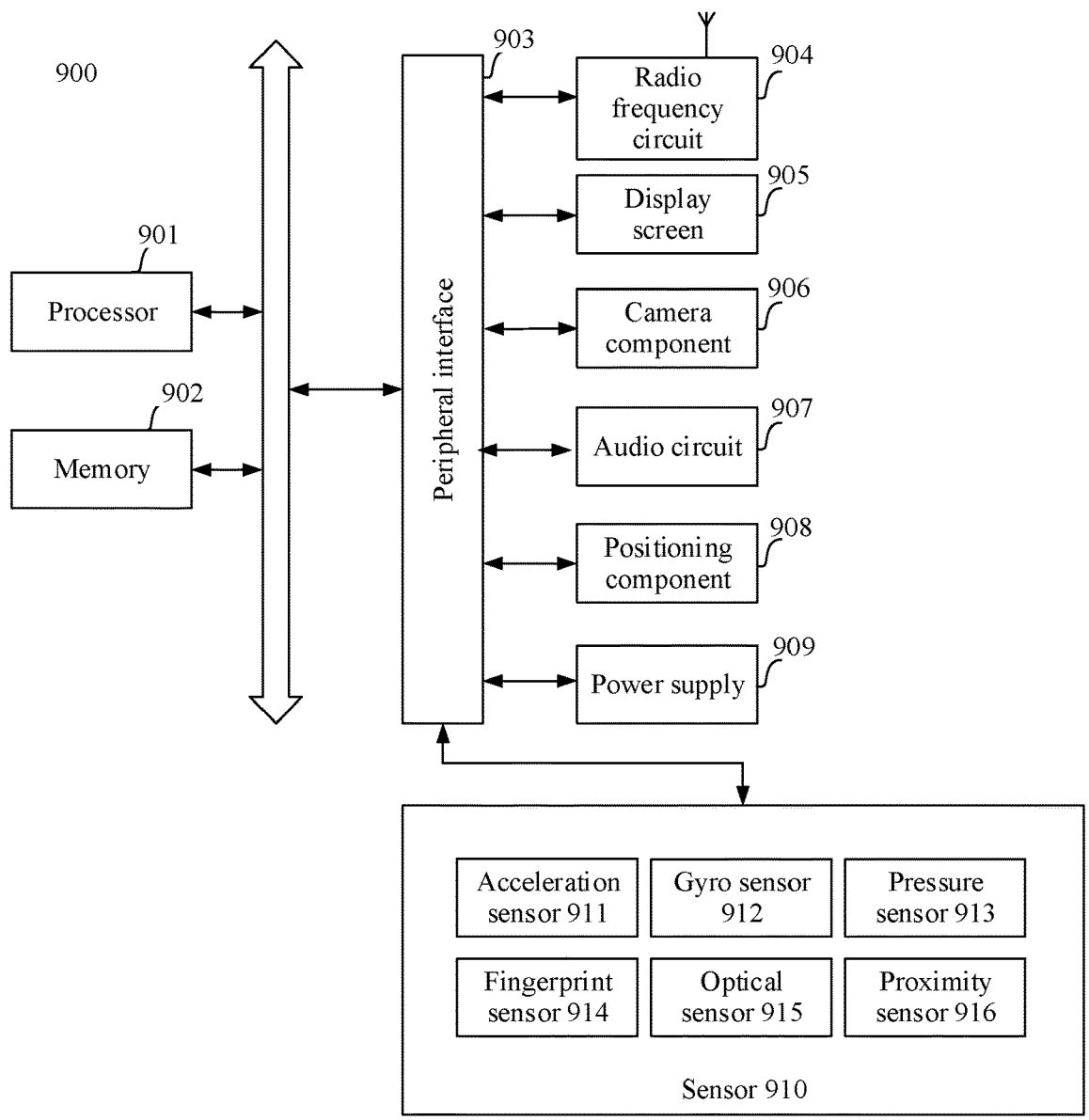
FIG. 9 is a schematic structural diagram of a terminal according to an embodiment of this disclosure.

FIG. 9 is a schematic structural diagram of a terminal 900 according to an exemplary embodiment of this disclosure. The terminal 900 may be configured to perform the steps performed by the computer device in the watermark detection method provided in the foregoing embodiments.

The terminal 900 includes a processor 901 (including processing circuitry) and a memory 902 (including a non-transitory computer-readable storage medium).

The processor 901 may include one or more processing cores such as a 4-core processor or an 8-core processor. The processor 901 may be implemented by using at least one hardware form of digital signal processing (DSP), a field-programmable gate array (FPGA), and a programmable logic array (PLA). The processor 901 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 901 may be integrated with a graphics processing unit (GPU). The GPU is configured to render and draw content that needs to be displayed on a display. In some embodiments, the processor 901 may further include an artificial intelligence (AI) processor. The AI processor is configured to process computing operations related to machine learning.

The memory 902 may include one or more computer-readable storage media. The computer-readable storage medium may be non-transient. The memory 902 may further include a high-speed random access memory and a non-volatile memory, such as one or more magnetic disk storage devices or a flash storage device. In some embodiments, a non-transitory computer-readable storage medium in the memory 902 is configured to store at least one program code, the at least one program code being configured to be executed by the processor 901 to implement the watermark detection method provided in the method embodiments of this disclosure.

In some embodiments, the terminal 900 may include: a peripheral device interface 903 and at least one peripheral device. The processor 901, the memory 902, and the peripheral device interface 903 may be connected by using a bus or a signal cable. Each peripheral device may be connected to the peripheral device interface 903 by using a bus, a signal cable, or a circuit board. In some embodiments, the peripheral device includes: at least one of a radio frequency (RF) circuit 904, a display screen 905, a camera component 906, an audio circuit 907, a positioning component 908, and a power supply 909.

The peripheral interface 903 may be configured to connect at least one peripheral related to input/output (I/O) to the processor 901 and the memory 902. In some embodiments, the processor 901, the memory 902, and the peripheral device interface 903 are integrated on the same chip or circuit board. In some other embodiments, any one or two of the processor 901, the memory 902, and the peripheral device interface 903 may be implemented on an independent chip or circuit board. This is not limited in this embodiment.

The RF circuit 904 is configured to receive and transmit an RF signal, which is also referred to as an electromagnetic signal. The RF circuit 904 communicates with a communication network and other communication devices through the electromagnetic signal. The RF circuit 904 converts an electrical signal into an electromagnetic signal for transmission, or converts a received electromagnetic signal into an electrical signal. In some embodiments, the RF circuit 904 includes: an antenna system, an RF transceiver, one or more amplifiers, a tuner, an oscillator, a digital signal processor, a codec chip set, a subscriber identity module card, and the like. The RF circuit 904 may communicate with other devices through at least one wireless communication protocol. The wireless communications protocol includes, but is not limited to: a metropolitan area network, generations of mobile communications networks (2G, 3G, 4G, and 5G), a wireless local area network and/or a Wi-Fi network. In some embodiments, the RF 904 may further include a circuit related to near field communication (NFC), which is not limited in this disclosure.

The display screen 905 is configured to display a user interface (UI). The UI may include a graph, a text, an icon, a video, and any combination thereof. When the display screen 905 is a touch display screen, the display screen 905 is further capable of collecting a touch signal on or above a surface of the display screen 905. The touch signal may be inputted to the processor 901 as a control signal for processing. In this case, the display screen 905 may be further configured to provide a virtual button and/or a virtual keyboard that are/is also referred to as a soft button and/or a soft keyboard. In some embodiments, there may be one display screen 905 disposed on a front panel of the terminal 900. In some other embodiments, there may be at least two display screens 905 respectively disposed on different surfaces of the terminal 900 or designed in a foldable shape. In some other embodiments, the display screen 905 may be a flexible display screen, disposed on a curved surface or a folded surface of the terminal 900. Even, the display screen 905 may be further set to have a non-rectangular irregular pattern, that is, a special-shaped screen. The display screen 905 may be prepared by using materials such as a liquid crystal display (LCD), an organic light-emitting diode (OLED), or the like.

The camera assembly 906 is configured to acquire an image or a video. In some embodiments, the camera component 906 includes a front-facing camera and a rear-facing camera. The front-facing camera is disposed on a front panel of the terminal 900, and the rear-facing camera is disposed on a rear surface of the terminal 900. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 906 may further include a flashlight. The flashlight may be a single-color-temperature flashlight or a double-color-temperature flashlight. The double-color-temperature flashlight is a combination of a warm flashlight and a cold flashlight, which may be used for light compensation at different color temperatures.

The audio circuit 907 may include a microphone and a speaker. The microphone is configured to collect sound waves of users and surroundings, and convert the sound waves into electrical signals and input the signals to the processor 901 for processing, or input the signals to the RF circuit 904 to implement voice communication. For the purpose of stereo collection or noise reduction, there may be a plurality of microphones, respectively disposed at different portions of the terminal 900. The microphone may be further an array microphone or an omni-directional collection type microphone. The speaker is configured to convert electrical signals from the processor 901 or the RF circuit 904 into acoustic waves. The speaker may be a thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 907 may also include an earphone jack.

The positioning component 908 is configured to determine a current geographic location of the terminal 900, to implement navigation or a location based service (LBS). The positioning component 908 may be a positioning component based on the Global Positioning System (GPS) of the United States, the BeiDou System of China, the GLONASS System of Russia, or the GALILEO System of the European Union.

The power supply 909 is configured to supply power to components in the terminal 900. The power supply 909 may be an alternating-current power supply, a direct-current power supply, a disposable battery, or a rechargeable battery. In a case that the power supply 909 includes the rechargeable battery, the rechargeable battery may support wired charging or wireless charging. The rechargeable battery may be further configured to support a fast charge technology.

In some embodiments, the terminal 900 further includes one or more sensors 910. The one or more sensors 910 include, but are not limited to, an acceleration sensor 911, a gyroscope sensor 912, a pressure sensor 913, a fingerprint sensor 914, an optical sensor 915, and a proximity sensor 916.

The acceleration sensor 911 may detect a magnitude of acceleration on three coordinate axes of a coordinate system established with the terminal 900. For example, the acceleration sensor 911 may be configured to detect components of gravity acceleration on the three coordinate axes. The processor 901 may control, according to a gravity acceleration signal collected by the acceleration sensor 911, the display screen 905 to display the user interface in a frame view or a portrait view. The acceleration sensor 911 may be further configured to acquire motion data of a game or a user.

The gyroscope sensor 912 may detect a body direction and a rotation angle of the terminal 900. The gyroscope sensor 912 may work with the acceleration sensor 911 to collect a 3D action performed by the user on the terminal 900. The processor 901 may implement the following functions according to data collected by the gyroscope sensor 912: motion sensing (for example, the UI is changed according to a tilt operation of the user), image stabilization during shooting, game control, and inertial navigation.

The pressure sensor 913 may be disposed at a side frame of the terminal 900 and/or a lower layer of the display screen 905. When the pressure sensor 913 is disposed at the side frame of the terminal 900, a holding signal of the user on the terminal 900 may be detected. The processor 901 performs left and right hand recognition or a quick operation according to the holding signal acquired by the pressure sensor 913. When the pressure sensor 913 is disposed on the low layer of the display screen 905, the processor 901 controls, according to a pressure operation of the user on the display screen 905, an operable control on the UI. The operable control includes at least one of a button control, a scroll-bar control, an icon control, and a menu control.

The fingerprint sensor 914 is configured to collect a fingerprint of the user, and the processor 901 recognizes an identity of the user according to the fingerprint collected by the fingerprint sensor 914, or the fingerprint sensor 914 recognizes the identity of the user according to the collected fingerprint. When the identity of the user is identified as a trusted identity, the processor 901 authorizes the user to perform a related sensitive operation. The sensitive operation includes unlocking a screen, viewing encrypted information, downloading software, payment, changing settings, and the like. The fingerprint sensor 914 may be disposed on a front surface, a back surface, or a side surface of the terminal 900. When the terminal 900 is provided with a physical button or a vendor logo, the fingerprint sensor 914 may be integrated with the physical button or the vendor logo.

The optical sensor 915 is configured to collect ambient light intensity. In an embodiment, the processor 901 may control display luminance of the display screen 905 according to the ambient light intensity collected by the optical sensor 915. Specifically, when the ambient light intensity is relatively high, the display luminance of the display screen 905 is increased. When the ambient light intensity is relatively low, the display luminance of the display screen 905 is reduced. In another embodiment, the processor 901 may further dynamically adjust a photographing parameter of the camera assembly 906 according to the ambient light intensity collected by the optical sensor 915.

The proximity sensor 916 is also referred to as a distance sensor and is disposed at the front panel of the terminal 900. The proximity sensor 916 is configured to collect a distance between the user and the front face of the terminal 900. In an embodiment, when the proximity sensor 916 detects that the distance between the user and the front surface of the terminal 900 gradually becomes smaller, the display screen 905 is controlled by the processor 901 to switch from a screen-on state to a screen-off state. In a case that the proximity sensor 916 detects that the distance between the user and the front surface of the terminal 900 gradually becomes larger, the display screen 905 is controlled by the processor 901 to switch from the screen-off state to the screen-on state.

A person skilled in the art may understand that a structure shown in FIG. 9 constitutes no limitation on the terminal 900, and the terminal may include more or fewer components than those shown in the figure, or combine some components, or use a different component deployment.

Figure 10:
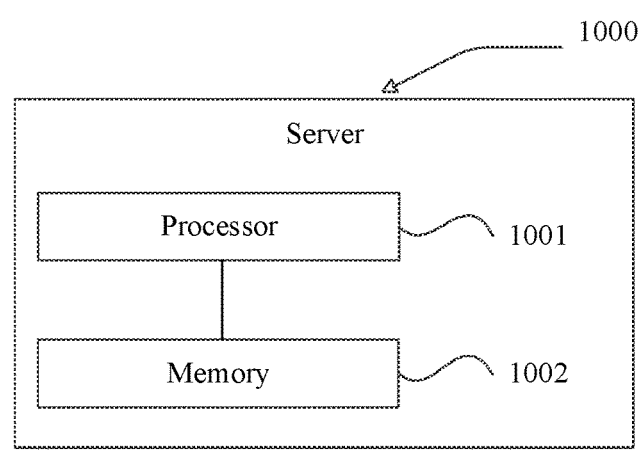
FIG. 10 is a schematic structural diagram of a server according to an embodiment of this disclosure.

FIG. 10 is a schematic structural diagram of a server according to an embodiment of this disclosure. The server 1000 may vary greatly due to different configurations or performance, and may include one or more processors (such as central processing units (CPUs)) 1001 and one or more memories 1002. The memory 1002 stores at least one program code, the at least one program code being loaded and executed by the processor 1001 to implement the methods provided in the foregoing method embodiments. Certainly, the device can also have a wired or wireless network interface, a keyboard, an I/O interface and other components to facilitate I/O. The device can also include other components for implementing device functions. Details are not described herein again.

The server 1000 may be configured to perform the steps performed by the computer device in the watermark detection method provided in the foregoing embodiments.

The embodiments of this disclosure further provide a computer device, the computer device including a processor and a memory, the memory storing at least one piece of program code, the at least one piece of program code, when being loaded and executed by the processor, implementing the operations performed in the watermark detection method in the foregoing embodiments.

An embodiment of this disclosure further provides a computer-readable storage medium, the computer-readable storage medium storing at least one program code, the program code being loaded and executed by a processor to implement the operations performed in the watermark detection method according to the foregoing embodiments.

An embodiment of this disclosure further provides a computer program product or a computer program. The computer program product or the computer program stores computer program code, the computer program code being stored in a computer-readable storage medium. A processor of a computer device reads the computer program code from the computer-readable storage medium, and the processor, when executing the computer program code, causes the computer device to implement the operations performed in the watermark detection method in the foregoing embodiments.

A person of ordinary skill in the art may understand that all or some of the steps implementing the methods in the foregoing embodiments may be implemented by hardware or a program instructing relevant hardware. The program may be stored in a computer-readable storage medium. The above-mentioned storage medium may be a read-only memory (ROM), a magnetic disk, an optical disk, or the like.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A watermark detection method comprising:
identifying, among plural stored videos, a second video having a second video feature matching a first video feature of a first video, the second video comprising watermark information;
traversing video frames in the first video, wherein for each traversed video frame in the first video,
based on a frame feature of the respective traversed video frame and frame features of a plurality of first candidate video frames in the second video, a respective similarity between the respective traversed video frame and each of the plurality of first candidate video frames is determined, and
a benchmark video frame from the plurality of first candidate video frames from the second video is determined, the benchmark video frame being a candidate video frame with a highest similarity to a first video frame in the first video;
determining a plurality of second candidate video frames from the second video, the plurality of second candidate video frames being video frames with a play interval from the benchmark video frame less than a first play duration;
determining a respective similarity between the first video frame and each second candidate video frame based on the frame feature of the first video frame and a frame feature of the respective second candidate video frame;
determining a video frame from the second video with a highest similarity to the first video frame, among the benchmark video frame and the plurality of second candidate video frames, as a second video frame;
comparing the first video frame in the first video and the second video frame in the second video to obtain a video conversion parameter, the video conversion parameter indicating a difference between the first video and the second video;
converting the first video based on the video conversion parameter to obtain a third video; and
performing watermark detection on the third video to obtain watermark information in the third video.

2. The method according to claim 1, wherein the identifying comprises:
performing feature extraction on the first video to obtain the first video feature;
querying a database based on the first video feature to find the second video feature matching the first video feature; and determining a video including the second video feature as the second video.

3. The method according to claim 2, wherein
the database stores a plurality of template feature sets, each template feature set has a corresponding class label and comprises at least one template video feature; and
the querying comprises:
querying a class label corresponding to the first video feature among class labels of the plurality of template feature sets; and
determining the second video feature from a template feature set having the class label that corresponds to the first video feature.

4. The method according to claim 1, wherein the comparing the first video frame and the second video frame to obtain the video conversion parameter comprises:
determining at least three key point pairs based on the first video frame and the second video frame, each key point pair comprising a first key point in the first video frame and a second key point in the second video frame matching the first key point;
determining a first conversion parameter based on differences between coordinates of each key point in the at least three key point pairs, the first conversion parameter representing a conversion function from the first video frame into the second video frame; and
determining the video conversion parameter based on the determined first conversion parameter.

5. The method according to claim 4, wherein the determining the first conversion parameter comprises:
determining a plurality of second conversion parameters based on the coordinates of each key point in the at least three key point pairs, the plurality of second conversion parameters representing a conversion function from the first video frame into the second video frame, similarities between the plurality of second conversion parameters and an average conversion parameter corresponding to the plurality of second conversion parameters being all greater than a second threshold; and
determining the average conversion parameter corresponding to the plurality of second conversion parameters as the first conversion parameter.

6. The method according to claim 1, wherein
the converting comprises:
converting each video frame in the first video based on the video conversion parameter to obtain a corresponding video frame in the third video; and
the performing watermark detection comprises:
performing the watermark detection on at least one video frame in the third video to obtain the watermark information.

7. The method according to claim 6, wherein the converting each video frame in the first video based on the video conversion parameter to obtain the corresponding video frame in the third video comprises:
determining, based on video frames matching each other in the first video and the second video, a cropped video frame area in at least one video frame in the second video that was cropped out of at least one video frame in the first video;
filling the cropped video frame area in the at least one video frame in the first video; and
converting the at least one filled video frame based on the video conversion parameter to obtain the corresponding video frame in the third video.

8. The method according to claim 6, wherein the performing the watermark detection on the at least one video frame in the third video to obtain the watermark information comprises:
obtaining a plurality of first frequency domain parameters of the at least one video frame, each first frequency domain parameter corresponding to one frequency band;
determining a second frequency domain parameter in the plurality of first frequency domain parameters, the second frequency domain parameter corresponding to a frequency band in which the watermark information is located; and
converting the second frequency domain parameter to obtain the watermark information.

9. A watermark detection apparatus, the apparatus comprising:
processing circuitry configured to
identify, among plural stored videos, a second video having a second video feature matching a first video feature of a first video, the second video comprising watermark information;
traverse video frames in the first video, wherein for each traversed video frame in the first video,
based on a frame feature of the respective traversed video frame and frame features of a plurality of first candidate video frames in the second video, a respective similarity between the respective traversed video frame and each of the plurality of first candidate video frames is determined, and
a benchmark video frame from the plurality of first candidate video frames from the second video is determined, the benchmark video frame being a candidate video frame with a highest similarity to a first video frame in the first video;
determine a plurality of second candidate video frames from the second video, the plurality of second candidate video frames being video frames with a play interval from the benchmark video frame less than a first play duration;
determine a respective similarity between the first video frame and each second candidate video frame based on the frame feature of the first video frame and a frame feature of the respective second candidate video frame;
determine a video frame from the second video with a highest similarity to the first video frame, among the benchmark video frame and the plurality of second candidate video frames, as a second video frame;
compare the first video frame in the first video and the second video frame in the second video to obtain a video conversion parameter, the video conversion parameter indicating a difference between the first video into the second video;
convert the first video based on the video conversion parameter to obtain a third video; and
perform watermark detection on the third video to obtain watermark information in the third video.

10. The apparatus according to claim 9, wherein the processing circuitry is further configured to
perform feature extraction on the first video to obtain the first video feature;
query a database based on the first video feature to find the second video feature matching the first video feature; and
determine a video including the second video feature as the second video.

11. The apparatus according to claim 10, wherein
the database stores a plurality of template feature sets, each template feature set has a corresponding class label and comprises at least one template video feature; and the processing circuitry is further configured to
query a class label corresponding to the first video feature among class labels of the plurality of template feature sets; and
determine the second video feature from a template feature set having the class label that corresponds to the first video feature.

12. The apparatus according to claim 9, wherein the processing circuitry configured to:
determine at least three key point pairs based on the first video frame and the second video frame, each key point pair comprising a first key point in the first video frame and a second key point in the second video frame matching the first key point;
determine a first conversion parameter based on differences between coordinates of each key point in the at least three key point pairs, the first conversion parameter representing a conversion function from the first video frame into the second video frame; and
determine the video conversion parameter based on the determined first conversion parameter.

13. The apparatus according to claim 12, wherein the processing circuitry configured to:
determine a plurality of second conversion parameters based on the coordinates of each key point in the at least three key point pairs, the plurality of second conversion parameters representing a conversion function from the first video frame into the second video frame, similarities between the plurality of second conversion parameters and an average conversion parameter corresponding to the plurality of second conversion parameters being all greater than a second threshold; and
determine the average conversion parameter corresponding to the plurality of second conversion parameters as the first conversion parameter.

14. A non-transitory computer-readable storage medium storing instructions which when executed by a processor cause the processor to perform:
identifying, among plural stored videos, a second video having a second video feature matching a first video feature of a first video, the second video comprising watermark information;
traversing video frames in the first video, wherein for each traversed video frame in the first video,
based on a frame feature of the traversed video frame and frame features of a plurality of first candidate video frames in the second video, a respective similarity between the traversed video frame and each of the plurality of first candidate video frames is determined, and
a benchmark video frame from a plurality of first candidate video frames from the second video is determined, the benchmark video frame being a candidate video frame with a highest similarity to a first video frame in the first video;
determining a plurality of second candidate video frames from the second video, the plurality of second candidate video frames being video frames with a play interval from the benchmark video frame less than a first play duration;

determining a respective similarity between the first video frame and each second candidate video frame based on the frame feature of the first video frame and a frame feature of the respective second candidate video frame;
determining a video frame from the second video with a highest similarity to the first video frame, among the benchmark video frame and the plurality of second candidate video frames, as a second video frame;
comparing the first video frame in the first video and the second video frame in the second video to obtain a video conversion parameter, the video conversion parameter indicating a difference between the first video and the second video;
converting the first video based on the video conversion parameter to obtain a third video; and
performing watermark detection on the third video to obtain watermark information in the third video.

15. The non-transitory computer-readable storage medium according to claim 14, wherein the instructions when executed by the processor further cause the processor to perform:
performing feature extraction on the first video to obtain the first video feature;
querying a database based on the first video feature to find the second video feature matching the first video feature; and
determining a video including the second video feature as the second video.

16. The non-transitory computer-readable storage medium according to claim 15, wherein
the database stores a plurality of template feature sets, each template feature set has a corresponding class label and comprises at least one template video feature; and
the querying comprises:
querying a class label corresponding to the first video feature among class labels of the plurality of template feature sets; and
determining the second video feature from a template feature set having the class label that corresponds to the first video feature.

17. The non-transitory computer-readable storage medium according to claim 14, wherein the instructions when executed by the processor further cause the processor to perform:
determining at least three key point pairs based on the first video frame and the second video frame, each key point pair comprising a first key point in the first video frame and a second key point in the second video frame matching the first key point;
determining a first conversion parameter based on differences between coordinates of each key point in the at least three key point pairs, the first conversion parameter representing a conversion function from the first video frame into the second video frame; and
determining the video conversion parameter based on the determined first conversion parameter.

18. The non-transitory computer-readable storage medium according to claim 17, wherein the instructions when executed by the processor further cause the processor to perform:
determining a plurality of second conversion parameters based on the coordinates of each key point in the at least three key point pairs, the plurality of second conversion parameters representing a conversion function from the first video frame into the second video frame, similarities between the plurality of second conversion parameters and an average conversion parameter corresponding to the plurality of second conversion parameters being all greater than a second threshold; and determining the average conversion parameter corresponding to the plurality of second conversion parameters as the first conversion parameter.

19. The non-transitory computer-readable storage medium according to claim 17, wherein the converting comprises:

converting each video frame in the first video based on the video conversion parameter to obtain a corresponding video frame in the third video; and the performing watermark detection comprises:

performing the watermark detection on at least one video frame in the third video to obtain the watermark information.

20. The non-transitory computer-readable storage medium according to claim 19, wherein the instructions when executed by the processor further cause the processor to perform:

determining, based on video frames matching each other in the first video and the second video, a cropped video frame area in at least one video frame in the second video that was cropped out of at least one video frame in the first video;

filling the cropped video frame area in the at least one video frame in the first video; and converting the at least one filled video frame based on the video conversion parameter to obtain the corresponding video frame in the third video.

* * * * *